(12) United States Patent
Harrison

(10) Patent No.: US 6,598,065 B1
(45) Date of Patent: Jul. 22, 2003

(54) METHOD FOR ACHIEVING CORRECTLY ROUNDED QUOTIENTS IN ALGORITHMS BASED ON FUSED MULTIPLY-ACCUMULATE WITHOUT REQUIRING THE INTERMEDIATE CALCULATION OF A CORRECTLY ROUNDED RECIPROCAL

(75) Inventor: John R. Harrison, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,651

(22) Filed: Dec. 23, 1999

(51) Int. Cl.[7] ................................. G06F 7/52
(52) U.S. Cl. ...................................... 708/654
(58) Field of Search .......................... 708/654

(56) References Cited

U.S. PATENT DOCUMENTS

| | | |
|---|---|---|
| 5,249,149 A | 9/1993 | Cocanougher et al. |
| 5,341,321 A | 8/1994 | Karp et al. |
| 5,515,308 A | 5/1996 | Karp et al. |
| 5,671,170 A | 9/1997 | Markstein et al. |
| 5,928,318 A * | 7/1999 | Araki ......................... 708/650 |
| 6,115,733 A * | 9/2000 | Oberman et al. .......... 708/605 |

OTHER PUBLICATIONS

Marius Cornea–Hasegan, Proving the IEEE of Iterative Floating–Point Square Root, Divide, and Remainder Algorithms, pp. 1–11, Intel Technology Journal Q2'98.

P.W. Markstein, Computation of elementary functions on the IBM RISC System/ 6000 Processor, Jan. 1990, pp. 111–119, vol. 34 No. 1.

* cited by examiner

Primary Examiner—David H. Malzahn
(74) Attorney, Agent, or Firm—Blakely, Sokoloff, Taylor & Zafman LLP

(57) ABSTRACT

A method and apparatus for performing a floating point division of a dividend (a) by a divisor (b) to produce a correctly rounded-to-nearest quotient (q') having a mantissa of P bits in a data processing system is disclosed.

In one embodiment, the data processing system computes a current quotient estimate ($q_m'$, where m represents an integer and m>=0) that is within 1 ulp of a true quotient (a/b). Then the data processing system computes a current remainder estimate ($r_m'$) based on the dividend (a), the divisor (b) and the current quotient estimate ($q_m'$). The data processing system also computes a current reciprocal estimate ($y_n'$, where n represents an integer and n>=0) based on a reciprocal intermediate value (E) with a relative error with respect to a true reciprocal of the divisor (1/b) of less than or equal to $z/(2^{2P})$ (where z is an integer derived from error analyses of computations of the current reciprocal estimate ($y_n'$)).

Finally, the data processing system obtains the correctly rounded-to-nearest quotient (q'), except possibly when $z>=(2^P-M_b)$ (where $M_b$ represents mantissa of the divisor, b), based on the current remainder estimate ($r_m'$), the current reciprocal estimate ($y_n'$) and current quotient estimate ($q_m'$).

31 Claims, 5 Drawing Sheets

METHOD FOR ACHIEVING CORRECTLY ROUNDED QUOTIENTS IN ALGORITHMS BASED ON FUSED MULTIPLY-ACCUMULATE WITHOUT REQUIRING THE INTERMEDIATE CALCULATION OF A CORRECTLY ROUNDED RECIPROCAL

FIELD OF THE INVENTION

This invention relates to data processing systems generally and particularly to perform a floating point division operation on a data processing system.

BACKGROUND

Floating point division operations often begin computing a quotient in a computer by generating an estimate of the reciprocal of the divisor first. Then the estimate of the reciprocal is further refined, or in other words, the precision of the estimate's mantissa is increased to exceed a threshold value, before the estimated reciprocal is applied to produce the quotient.

The Institute of Electrical and Electronic Engineers (IEEE) provides a standard for floating point arithmetic and correct results. This standard is entitled "An American National Standard—IEEE Standard For Binary Floating-Point Arithmetic", ANSI/IEEE std. 754-1985 (hereinafter IEEE 754 standard). One prior art approach, described in Cocanougher et al., U.S. Pat. No. 5,249,149 (hereinafter Cocanougher), discloses a method of performing a floating point division conforming to this IEEE 754 standard.

Specifically, the prior art approach obtains a correctly rounded-to-nearest quotient with two prerequisite conditions. The conditions are: 1) the reciprocal of the divisor is correctly rounded, except for one special case; and 2) the initial estimated quotient is known to be within 1 unit-in-the-last-place (ulp) of the correct quotient. The following further illustrates this prior art approach by mathematical equations:

Equation 1: $|q'-a/b|<=1$ ulp of a/b, where a/b represents "the correct quotient", and q' represents "the initial estimated quotient"

Equation 2: y'=rounded (1/b), where 1/b represents "the true reciprocal of the divisor", and y' represents a rounded value of (1/b).

Equation 3: when y' is correctly rounded (except for one special case), then $q_{final}'$ (or "correctly rounded-to-nearest quotient") can be obtained by performing the following:

r'=rounded (a−b*q')

$q_{final}'$=rounded (q'+r'*y')

Although this prior art approach provides one method of performing floating point division and producing a correctly rounded quotient, satisfying the two required conditions described above can be difficult. Specifically, obtaining a correctly rounded y' often demands iterations of calculating an error parameter and a y' value associated with the error parameter. These iterations consume clock cycles and as a result negatively impact the overall performance of a floating point division operation.

Therefore, a method and apparatus is needed to further speed up the process of obtaining a correctly rounded quotient.

SUMMARY OF THE INVENTION

A method and apparatus for performing a floating point division of a dividend (a) by a divisor (b) to produce a correctly rounded-to-nearest quotient (q') having a mantissa of P bits in a data processing system is disclosed.

In one embodiment, the data processing system computes a current quotient estimate ($q_m'$, where m represents an integer and m>=0) that is within 1 ulp of a true quotient (a/b). Then the data processing system computes a current remainder estimate ($r_m'$) based on the dividend (a), the divisor (b) and the current quotient estimate ($q_m'$). The data processing system also computes a current reciprocal estimate ($y_n'$, where n represents an integer and n>=0) based on a reciprocal intermediate value (E) with a relative error with respect to a true reciprocal of the divisor (1/b) of less than or equal to $z/(2^{2P})$ (where z is an integer derived from error analyses of computations of the current reciprocal estimate ($y_n'$)).

Finally, the data processing system obtains the correctly rounded-to-nearest quotient (q'), except possibly when $z>=(2^P-M_b)$ (where $M_b$ represents mantissa of the divisor, b), based on the current remainder estimate ($r_m'$), the current reciprocal estimate ($y_n'$) and current quotient estimate ($q_m'$).

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus of performing a floating point division is described. In the following description, numerous specific details are set forth such as, single precision mode, double-extended precision mode, etc., in order to provide a thorough understanding of the disclosed method and apparatus. However, it will be apparent to one of ordinary skill in the art that the disclosure may be practiced without these particular details. In other instances, well-known elements and theories, such as IEEE 754 standard, single precision mode, double-extended precision mode, mantissa, power series, etc., have not been discussed in special details in order to avoid obscuring the disclosure.

The round-to-nearest mode refers to a rounding technique, which selects the closest representable floating-point number to a true numerical value. A "correctly rounded number" used throughout the subsequent paragraphs then represents the closest representable floating-point number. The following paragraphs also draw a distinction between an estimated or a rounded value to a true value. A true value represents an error free value, whereas an estimated or a rounded value is an approximation of a true value. Furthermore, an estimated or a rounded value is denoted as "value'", whereas a true value is simply "value" throughout the disclosure. The term "relative error" is used throughout the disclosure to describe a mathematical relationship. For example, if the relative error in A with respect to B is less than $x^2$, then the mathematical expression is:

$|A-B| < x^{2} * |B|$, where $|B|$ is the magnitude of B.

Unit in the Last Place (or ulp) refers to a distance between two floating points. An example further illustrates this concept. For any exact real number, "x", two straddling floating point values "a" and "b" exist, and a<=x<=b. Thus, the following equation represents a floating point number "x'" approximates "x" to within k ulps:

$|x'-x| <= k * ulp(x)$.

Figure 1:
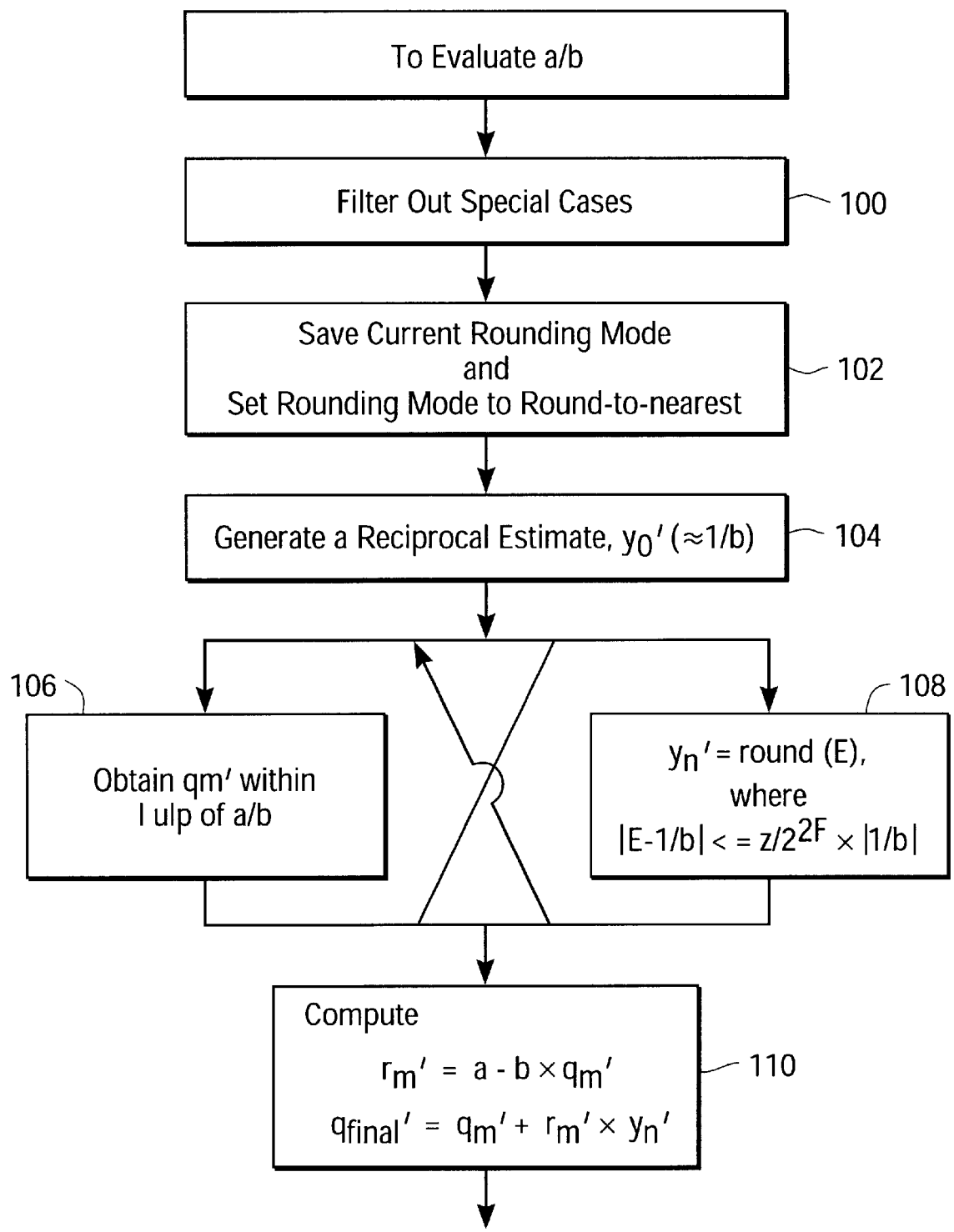
FIG. 1 is a flow chart of one embodiment of a process for performing a floating point division to obtain a correctly round-to-nearest quotient.

FIG. 1 demonstrates a flow chart of one embodiment of a data processing system achieving a correctly rounded quotient. Specifically, the data processing system performs a floating point division of a/b. In block 100, numbers such as infinities, zeros or numbers that do not represent numeric values are removed from computation. In other words, when such numbers are encountered, the results specified by standards such as the IEEE 754 standard are returned. In block 102, the data processing system's present rounding mode is changed to a round-to-nearest mode. In block 104, the data processing system formulates an initial estimate of the reciprocal of the divisor, or $y_0'$.

Additionally, the data processing system attempts to improve quotient estimate $q_m'$ and reciprocal estimate $y_n'$ to satisfy the conditions shown in blocks 106 and 108. The data processing system may execute blocks 106 and 108 in either order relative to each other.

Subscript 'm' and subscript 'n' are nonzero integers and represent an iteration count. Thus, $q_1'$ signifies the value of q' derived from its first iteration, and $q_2'$ corresponds to its second iteration, etc. When the conditions in blocks 106 and 108 are both satisfied, the data processing system can obtain a correctly rounded quotient by executing the equations shown in block 110. It should also be emphasized by as a result of satisfying the condition in block 108, $y_n'$ in block 110 approximates the true value of 1/b to a relative error less than ½P. P stands for the precision of the floating point number, $q_{final}'$, or in other words, the number of mantissa bits of $q_{final}'$. Lastly, in one embodiment of this described process to achieve the desired quotient, after having calculated $r_m'$ shown in block 110, the data processing system restores its original rounding mode before computing $q_{final}'$.

The following are one set of relevant mathematical equations to further explain FIG. 1:

Equation 1: $y_0' = 1/b * (1+\text{error parameter})$, where the error parameter is typically predetermined.

Equation 2: $y_n' = \text{round}(E)$, where E is a mathematical expression and y' is the rounded value of E.

Equation 3: When $|E - 1/b| <= z/2^{P} * |1/b|$, then $|y_n' - 1/b| < \frac{1}{2}^{P} * |1/b|$, given that $z < 2^{P} - m_b$, where P represents the floating point format concerned. $m_b$ represents the mantissa of b, and z is an mathematical value derived from the same error analysis performed by the prior executions of Equation 2 & 3.

Equation 4: When $q_m'$ is a floating point number within 1 ulp of the true value of (a/b) and $|y' - 1/b| < \frac{1}{2}^{P} * |1/b|$, then $r_m' = a - b*q_m'$, where $r_m'$ is a current remainder estimate $q_{final}' = q_m' + r_m' * y_n'$, where $q_{final}'$ is the correctly rounded-to-nearest quotient.

On the other hand, when $z >= 2^{P} - m_b$ in Equation 3, $y_n'$ may not satisfy the condition shown in Equation 3, namely, $|y_n' - 1/b| < \frac{1}{2}^{P} * |1/b|$. In those exception cases, analyses are conducted to ascertain whether these exception cases of $y_n'$ will still yield the desirable quotient, $q_{final}'$. Section 2 of the Mathematical Appendix describes a number of approaches to perform the mentioned analyses.

Figure 2:
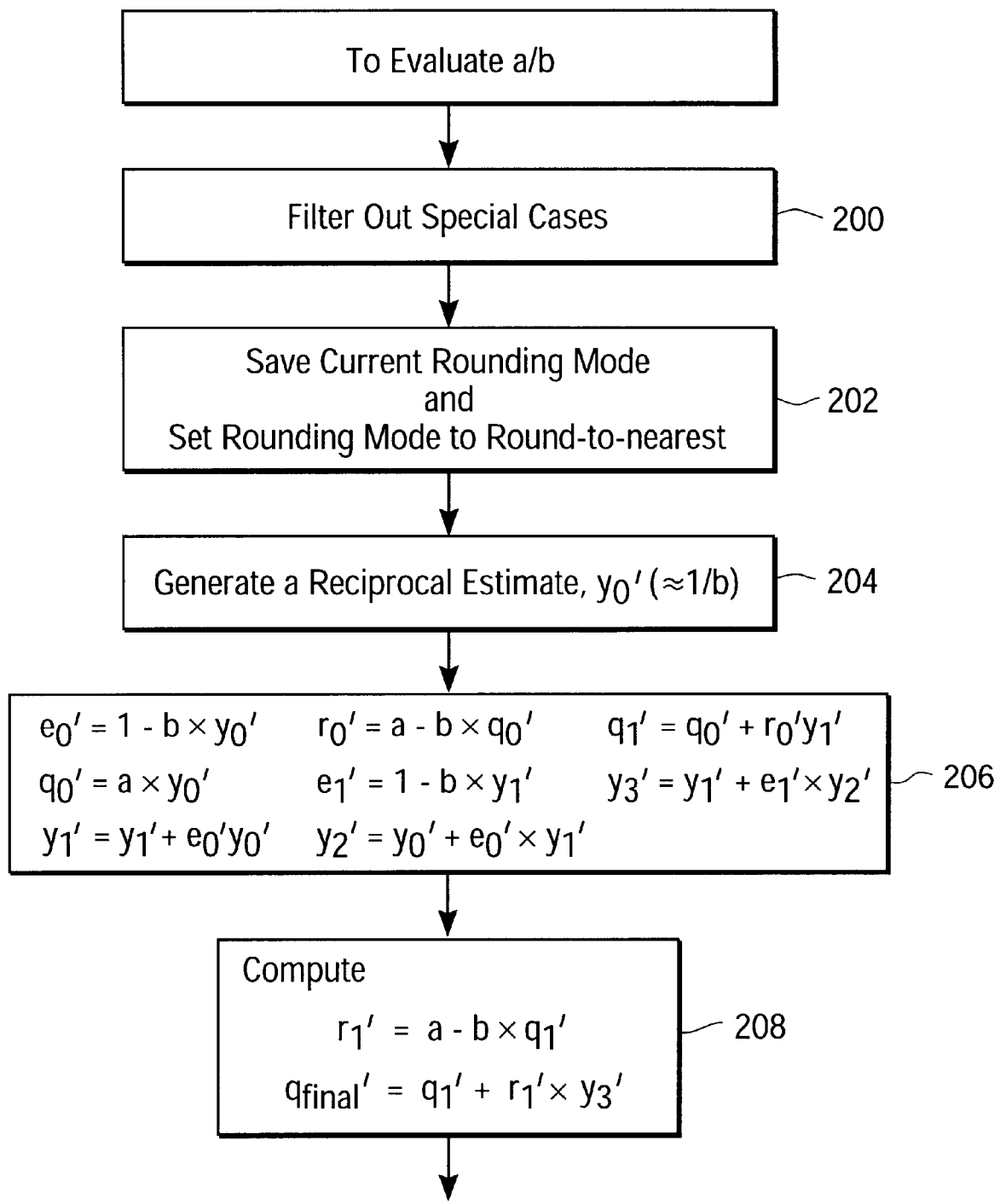
FIG. 2 is a flow chart illustrating one embodiment of a process for performing a floating point division.

FIG. 2 illustrates a flow chart of one embodiment of a single precision floating point division of a/b in a data processing system. In block 200, this embodiment removes numbers such as infinities, zeros or numbers that do not represent numeric values from computation and returns results specified by standards, such as the IEEE 754 standard instead. In block 202, the data processing system's present rounding mode is changed to a round-to-nearest mode. In block 204, the data processing system formulates an initial estimate of the reciprocal of the divisor, or $y_0'$ by accessing a table stored in its memory.

In this embodiment, after going through the sequence of equations in block 206, the last reciprocal estimate, $y_3'$, satisfies the condition expressed by Equation 3 above. Therefore, the data processing system proceeds to calculate the final quotient estimate in block 208. In one embodiment of the data processing system, the system restores the original rounding mode after computing $r_1'$ but before $q_{final}'$ shown in block 208. The sequence of equations shown in block 206 may be grouped into stages, where the instructions within each group may be executed in parallel. Moreover, because of the less than stringent conditions imposed by Equations 3 and 4 demonstrated above, this embodiment of the floating point division yields low latency.

Figure 3:
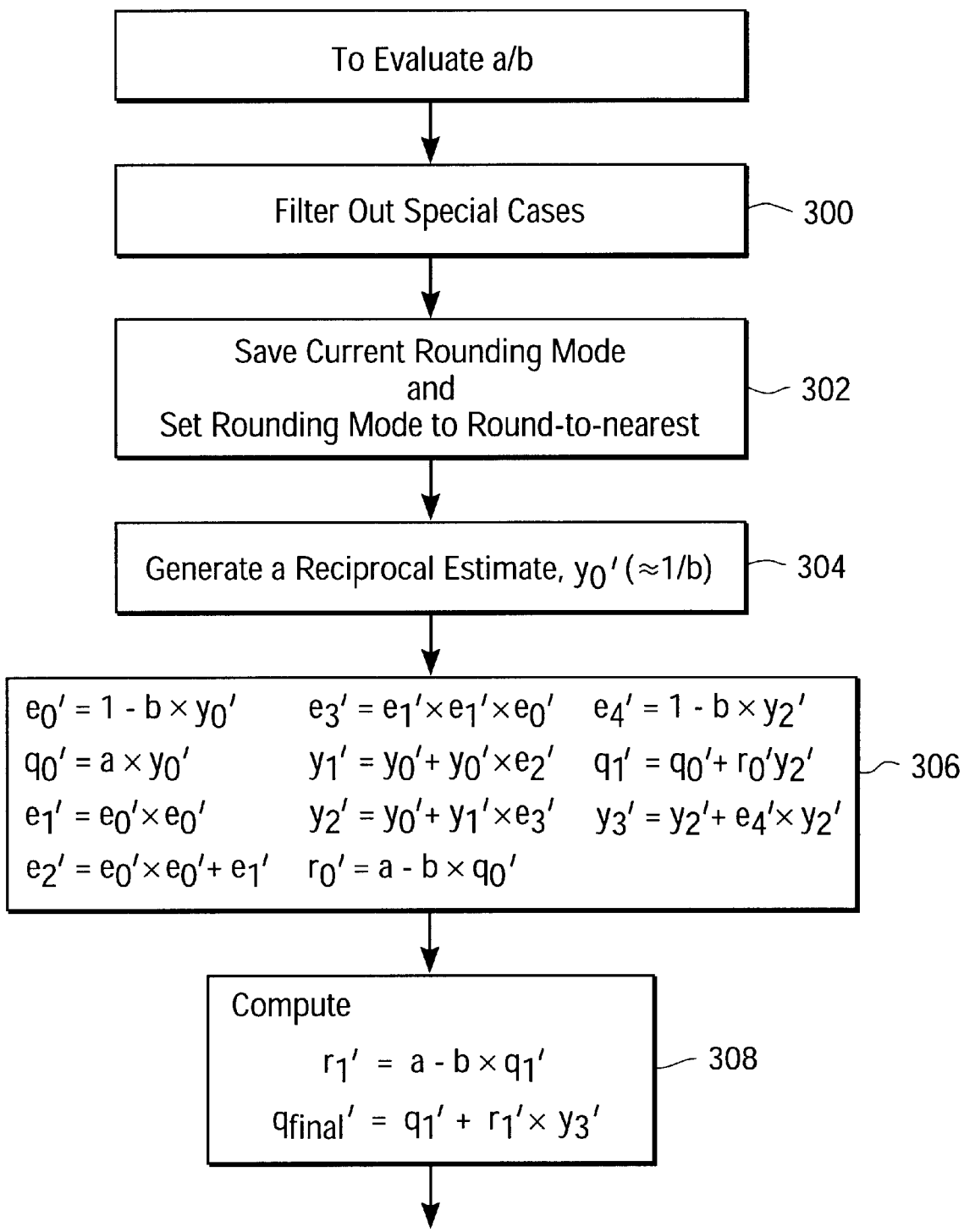
FIG. 3 is a flow chart illustrating another embodiment of a process for performing floating point division.

FIG. 3 illustrates one embodiment of a double-extended precision floating point division of a/b in a data processing system. The main difference between FIG. 3 and FIG. 2 is block 306. Specifically, unlike the single precision implementation shown in block 206 of FIG. 2, the sequence of equations demonstrated in block 306 introduce approximation error, $e_n'$, and reciprocal estimate, $y_n'$, which represent intermediate results in a power series computation. More particularly, using $y_2'$ shown in block 306 as an illustration, $y_2' = y_0'(1 + e_0' + e_0^{2'} + e_0^{3'} + e_0^{4'} + e_0^{5'} + e_0^{6'})$ in a power series representation. Block 306 utilizes the intermediate results such as $e_1'$ and $y_1'$ to represent this power series in one set of equations.

When exception cases arise from an embodiment of a floating point division, the embodiment may be fine-tuned in order to handle them. For example, when exception cases arise as a result of executing the equations shown on FIGS. 2 and 3, those sets of equations may be modified to accommodate the exception cases.

Figure 4:
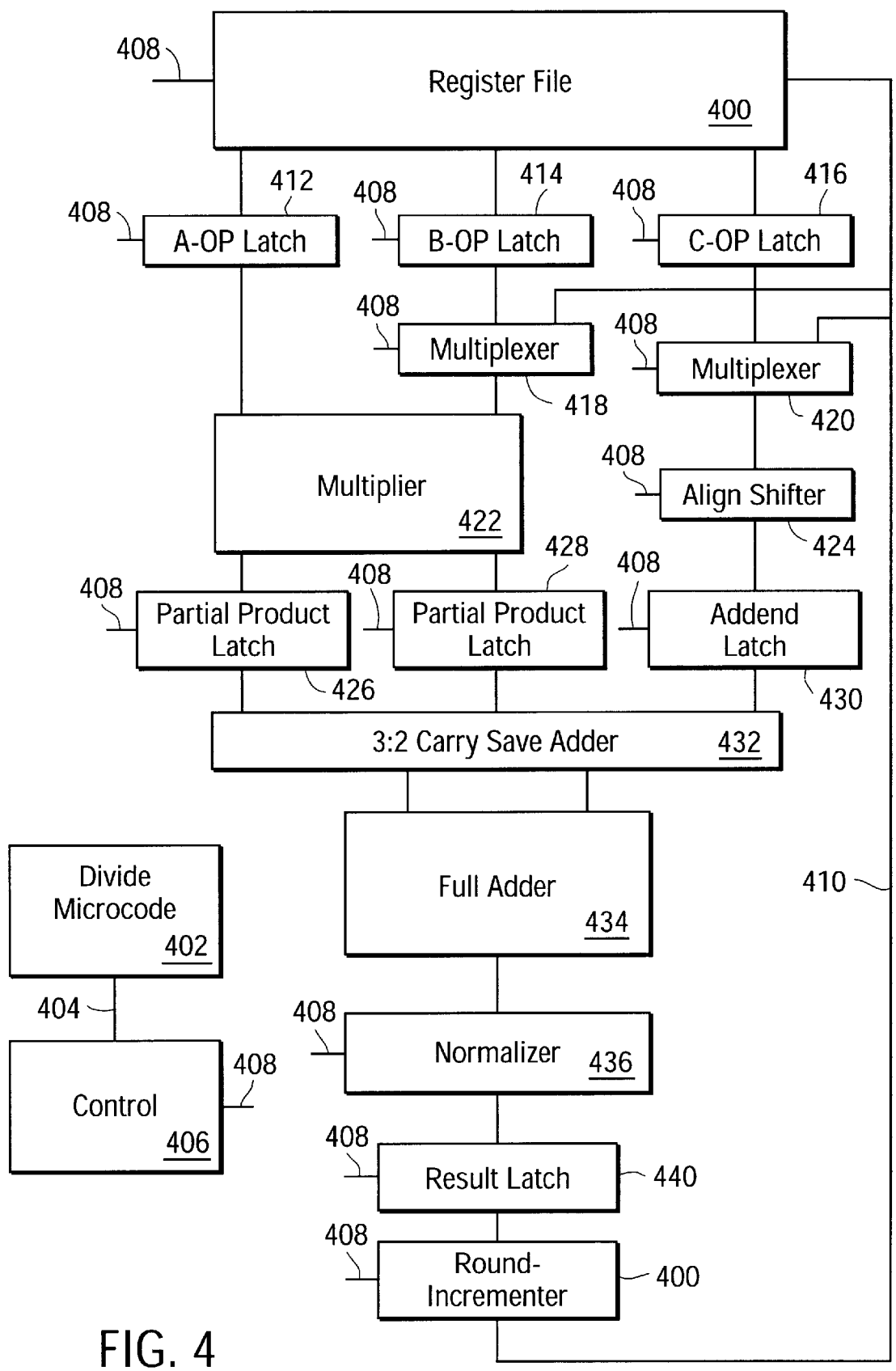
FIG. 4 illustrates a block diagram of one embodiment of a floating point arithmetic unit.

FIG. 4 shows one embodiment of a floating point arithmetic unit used in the data processing system. This particular floating point unit provides for a multiplication and addition operation to occur in parallel. In this embodiment, register file 400 contains an integer number of floating point arithmetic words. Under the control of control circuitry 406 through control line 408, a floating point arithmetic data word is loaded into the A OPERATION LATCH 412. Likewise, the contents of B OPERATION LATCH 414 and C OPERATION LATCH 416 are loaded. The contents of the A operation latch 412 and B operation latch 414 are sent to a multiplier 422. The contents of the B operation latch 414 passes through a multiplexor 418 to be explained later.

The multiplier 418 provides a partial product to latch 426 and a second partial product to latch 428. The C operation latch 416 provides the floating point number through multiplexor 420 to an align shifter 424. The output of the align shifter 424 is provided to the addend latch 430. It should be understood that the contents of the registers that are operated on by the multiplier 422 and the align shifter 424 is that of the mantissa of the floating point number. The operation of multiplication of the exponent is provided in the control circuitry 406 and consists of addition. The result of the exponent calculation provides an input to the alignment shifter 424 to properly shift the contents of the C operation latch 416 so that it may be added to the product of the A operation latch 412 and the B operation latch 414.

The 3:2 carry save adder 432 receives the contents of latches 426, 428 and 430. Two outputs are provided to the full adder 434. The contents of the full adder 434 is normalized in the normalizer circuit 436 and then stored in the result latch 440. The output of the result latch 440 is provided to the round incrementer 400. The output of the round incrementer 400 can be provided to the register file 400 or as a substitute for mutiplexor 418 to the multiplier 422 or through the multiplexor 420 to the align shifter 424. Since this floating point arithmetic logic unit operates in a pipelined fashion, by providing multipelxor 418 and 420, results from a previous instruction may be used for a successive instruction without being stored in the register file 400.

In the divide operation, the control circuitry 406 functions with a divide microcode control circuit 402 via line 404 to implement the conditions and equations illustrated in FIGS. 1, 2 and 3.

Figure 5:
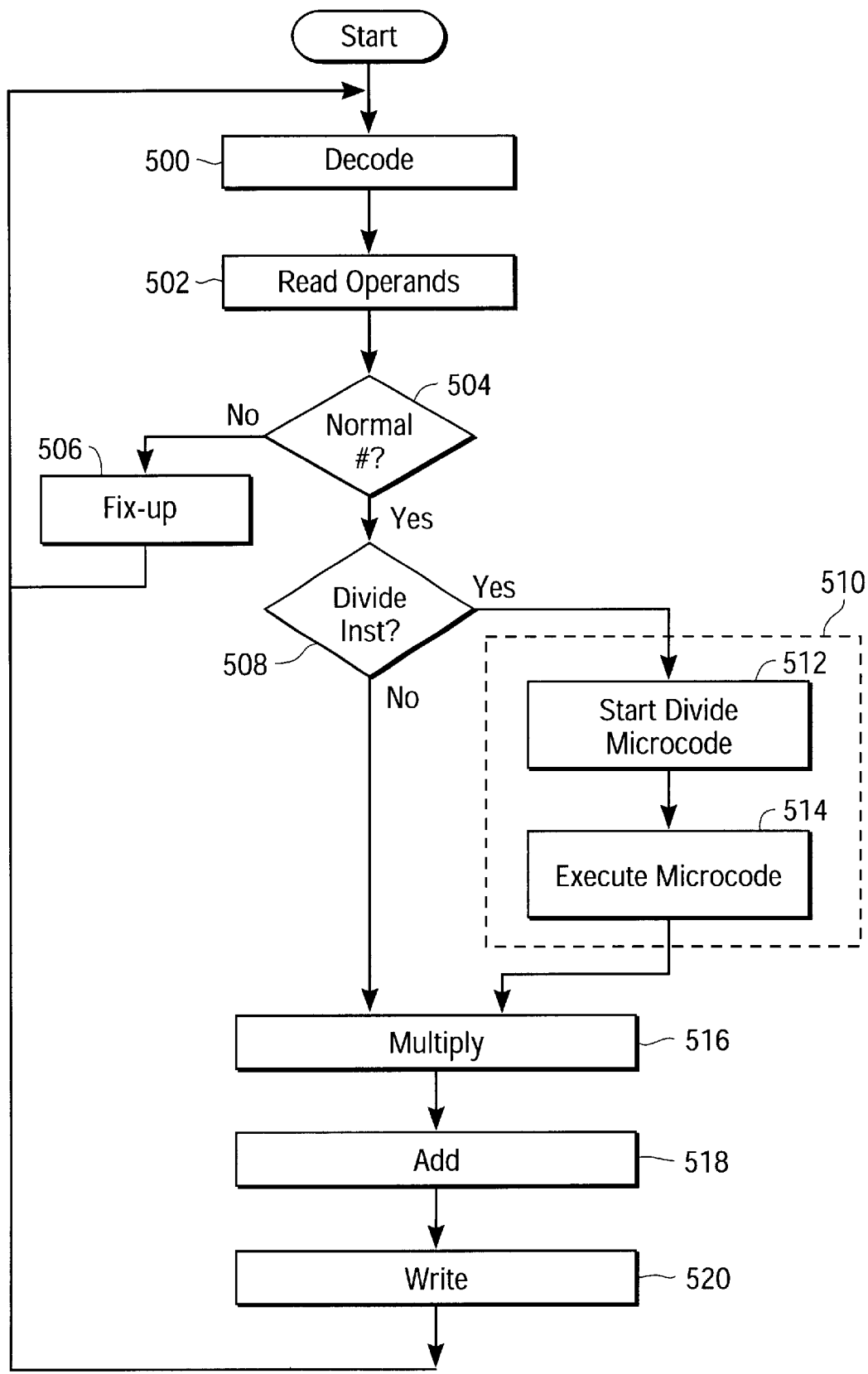
FIG. 5 is a flow chart depicting operations to be performed by one embodiment of a control circuitry in a floating point arithmetic unit.

FIG. 5 illustrates the control flow of the control circuit 406. Initially, the floating point instruction is decoded in step 500 and the operands are read in block 502 (from the register file 400). In decision block 504, a determination is made as to whether or not the operands are normal numbers (corresponding to block 200 in FIG. 2, filtering out special cases). If the operands are not normal numbers, the control flow proceeds to block 506 to "fix-up" the numbers according to the IEEE standard and the control flow returns to block 500.

However, if the numbers are normal numbers, the control flow proceeds to block 508 to determine if there is a divide instruction present. If there is no divide instruction, the control flow proceeds to block 516. If there is a divide instruction present, the control flow proceeds to the divide microcode 510 including block 512 which initiates the divided microcode procedure and block 514 which executes the microcode. After block 514, the control flow proceeds to block 516 to perform a multiply operation. Then in block 518, an add operation is performed followed by block 520 which is the write back into the register file 400.

In conjunction with FIG. 2 and FIG. 3, Block 516, or the multiplication block, corresponds to the multiplication of the remainder estimate $r_1'$ by the reciprocal estimate $y_3'$ in blocks 208 and 308. Block 518 of FIG. 5 also corresponds to the adding of the quotient estimate $q_1'$ to the product of the remainder estimate $r_1'$ times the reciprocal estimate $y_3'$ in blocks 208 and 308. The write back block 520 corresponds to the writing of the final quotient $q_{final}'$ shown in FIGS. 2 and 3 into the register file 400.

Thus, a method and apparatus for performing a floating point division to obtain a correctly rounded-to-nearest quotient have been disclosed. Although the method and apparatus have been described particularly with reference to the figures, the method and apparatus may appear in any number of systems and still perform all the discussed functionality. It is further contemplated that many changes and modifications may be made by one of ordinary skill in the art without departing from the spirit and scope of the disclosure.

What is claimed is:

1. A method of performing a floating point division of a dividend (a) by a divisor (b) to produce a correctly rounded-to-nearest quotient (q') having a mantissa of P bits in a data processing system, comprising:

a) computing a current quotient estimate ($q_m'$, where m represents an integer and m>=0) that is within 1 ulp of a true quotient (a/b);

b) computing a current reciprocal estimate ($y_n'$, where n represents an integer and n>=0) based on a reciprocal intermediate value (E) with a relative error with respect to a true reciprocal of the divisor (1/b) of less than or equal to $z/(2^{2P})$ (where z is an integer derived from error analyses of computations of the current reciprocal estimate ($y_n'$));

c) computing a current remainder estimate ($r_m'$) based on the dividend (a), the divisor (b) and the current quotient estimate ($q_m'$); and d) obtaining the correctly rounded-to-nearest quotient (q'), except possibly when $z>=(2^P-M_b)$ (where $M_b$ represents mantissa of the divisor, b), based on the current remainder estimate ($r_m'$), the current reciprocal estimate ($y_n'$) and current quotient estimate ($q_m'$).

2. The method according to claim 1, wherein the method performs round-to-nearest operations.

3. The method according to claim 2, wherein 1(*a*) further comprises:

a) computing an initial quotient estimate ($q_0'$) by multiplying an initial reciprocal estimate by the dividend ($y_0'*a$); and b) computing the current quotient estimate ($q_m'$) from rounding a quotient intermediate value, wherein the quotient intermediate value is derived from the previously computed current quotient estimate ($q_{m-i}'$, where i represents an integer and (m-i)>=0), the current reciprocal estimate ($y_n'$, where n represents an integer and n>=0) and the current remainder estimate ($r_m'$); and c) computing an initial reciprocal estimate of the divisor ($y_0'$) based on a predetermined error parameter.

4. The method according to claim 3, wherein 3(b) further comprises: computing $q_1'=q_0'+r_0'*y_1'$ for a single precision implementation of the floating point division.

5. The method according to claim 3, wherein 3(*b*) further comprises: computing $q_1'=q_0'+r_0'*y_2'$ for a double extended precision implementation of the floating point division.

6. The method according to claim 2, wherein 1(*b*) further comprises:

i) computing the current remainder estimate ($r_m'$) from rounding a remainder intermediate value, wherein the remainder intermediate value is derived from the current quotient estimate ($q_m'$), the dividend (a) and the divisor (b).

7. The method according to claim 6, where computing the current remainder estimate to satisfy 1(*b*) further comprises:

a) computing $r_0'=a-b*q_0'$; and b) computing $r_1'=a-b*q_1'$ for a single precision and a double extended precision implementations of the floating point division.

8. The method according to claim 2, wherein 1(*c*) further comprises:

a) computing a current error approximation ($r_m'$) where n represents an integer and n>0) from rounding an error intermediate value, wherein the error intermediate value is derived from previously computed error approximations ($e_{n-i}'$, where i represents an integer and (n-i)>=0), the divisor (b) and the current reciprocal estimate ($y_n'$); and b) computing the reciprocal intermediate value (E) according to previously computed reciprocal estimates ($y_{n-i}'$, where i represents an integer and (n-i) >=0) and the current error approximation ($e_n'$).

9. The method according to claim 8, where computing the current reciprocal estimate to satisfy 1(c) further comprises:
   a) computing $e_0'=1-b*y_0'$;
   b) computing $y_1'=y_0'+e_0'*y_0'$;
   c) computing $e_1'=1-b*y_1'$;
   d) computing $y_2'=y_0'+e_0'*y_1'$; and
   e) computing $y_3'=y_1'+e_1'*y_2'$ for a single precision implementation of the floating point division.

10. The method according to claim 8, where computing the current reciprocal estimate to satisfy 1(c) further comprises:
   a) computing $e_0'=1-b*y_0'$;
   b) computing $e_1'=e_0'* e_0'$;
   c) computing $e_2'=e_0'* e_0'+e_0'$;
   d) computing $e_3'=e_1'*e_1'+e_1'$;
   e) computing $y_1'=y_0'+e_2'*y_0'$;
   f) computing $y_2'=y_0'+e_3'*y_1'$;
   g) computing $e_4'=1-b*y_2'$; and
   h) computing $y_3'=y_2'+e_4'*y_2'$ for a double extended, precision implementation of the floating point division.

11. The method according to claim 1, wherein 1(c) further comprises:
   a) identifying an exception case by selecting the current reciprocal estimate ($y_n'$) which corresponds to z>=2P−the divisor (b) mantissa; and
   b) verifying correctness of the exception case.

12. A method of performing a floating point division of a dividend (a) by a divisor (b) to produce a correctly rounded-to-nearest quotient (q') having a mantissa of P bits in a data processing system, comprising:
   a) computing an initial reciprocal estimate of the divisor ($y_0'$) based on a predetermined error parameter;
   b) computing a current error approximation ($e_n'$, where n represents an integer and n>0) from the divisor (b) and a current reciprocal estimate ($y_n'$);
   c) computing an initial quotient estimate ($q_0'$) by multiplying the initial reciprocal estimate by the dividend ($y_0'*a$) and followed by rounding;
   d) computing a current quotient estimate ($q_m'$, where m represents an integer and m>=0) from rounding a quotient intermediate value, wherein the quotient intermediate value is derived from the previously computed current quotient estimate ($q_{m-i}'$, where i represents an integer and (m−i)>=0), the current reciprocal estimate ($y_n'$), a current remainder estimate ($r_m'$, where m represents an integer and m>=0) or the dividend (a) until the current quotient estimate ($q_m'$) is within 1 ulp of a true quotient (a/b) derived from the dividend (a) and the divisor (b); and
   e) computing the current remainder estimate ($r_m'$, where m represents an integer and m>=0) from rounding a remainder intermediate value, wherein the remainder intermediate value is derived from the current quotient estimate ($q_m'$), the dividend (a) and the divisor (b) until conditions in d. are satisfied;
   f) computing the current reciprocal estimate ($y_n'$, where n represents an integer) from rounding a reciprocal intermediate value (E), wherein the reciprocal intermediate value (E) is computed according to the previously computed reciprocal estimate ($y_{n-i}'$, where i represents an integer and (n−i)>=0) or the current error approximation ($e_n'$) until the reciprocal intermediate value (E) has a relative error with respect to a true reciprocal of the divisor (1/b) of less than or equal to $z/(2^{2P})$ (where z is an integer derived from a prior execution of 13(f); and
   g) obtaining the correctly rounded-to-nearest quotient (q'), except possibly when $z>=(2^P-M_b)$ (where $M_b$ represents mantissa of the divisor, b), by multiplying the current remainder estimate ($r_m'$) obtained in 13(e) by the current reciprocal estimate ($y_n'$) in 13(f) to produce a final product, adding the current quotient estimate ($q_m'$) to the final product to produce a final sum ($q_m'+r_m'* y_n'$), and followed by rounding the final sum.

13. The method according to claim 12, wherein 13(f) further comprises:
   a) identifying an exception case by selecting the current reciprocal estimate ($y_n'$) which corresponds to z>=2P−the divisor (b) mantissa; and
   b) verifying correctness of the exception case.

14. The method according to claim 12, wherein the method performs round-to-nearest operations.

15. The method according to claim 14, wherein 13(c) for a single precision implementation of the floating point division further comprises:
   a) computing $e_0'=1-b*y_0'$; and
   b) computing $e1'=1-b*y1'$.

16. The method according to claim 14, wherein 13(c) for a double extended precision implementation of the floating point division further comprises:
   a) computing $e_0'=1-b*y_0'$;
   b) computing $e_1'=e_0'* e_0'$;
   c) computing $e_2'=e_0'* e_0'+e_0'$;
   d) computing $e_3'=e_1'*e_1'+e_1'$; and
   e) computing $e_4'=1-b*y_2'$.

17. The method according to claim 14, wherein 13(d) for a single precision implementation of the floating point division further comprises computing $q_1'=q_0'+r_0'*y_1'$.

18. The method according to claim 14, wherein 13(d) for a double extended precision implementation of the floating point division further comprises computing $q_1'=q_0'+r_0'*y_2'$.

19. The method according to claim 14, wherein 13(e) for a single precision and a double extended implementations of the floating point division further comprises:
   a) computing $r_0'=a-b*q_0'$; and
   b) computing $r_1'=a-b*q_1'$.

20. The method according to claim 14, wherein 13(f) for a single precision implementation of the floating point division further comprises:
   a) computing $y_1'=y_0'+e_0'*y_0'$;
   b) computing $y_2'=y_0'+e_0'*y_1'$; and
   c) computing $y_3'=y_1'+e_1'*y_2'$.

21. The method according to claim 14, wherein 13(f) for a double extended precision implementation of the floating point division further comprises:
   a) computing $y_1'=y_0'+e_2'*y_0'$;
   b) computing $y_2'=y_0'+e_3'*y_1'$; and
   c) computing $y_3'=y_2'+e_4'y_2'$.

22. A data processing system for performing a floating point division of a dividend (a) by a divisor (b) to produce a correctly rounded-to-nearest quotient (q') having a mantissa of P bits, comprising:
   a memory;
   a multiplying circuit;
   an adding circuit coupled to the multiplying circuit;
   rounding circuit coupled to the adding circuit; and a control circuit coupled to the multiplying circuit, the adding circuit and the rounding circuit, wherein the data processing system:

a) computes an initial reciprocal estimate of the divisor ($y_0'$) based on a predetermined error parameter stored in the memory;

b) computes an initial quotient estimate ($q_0'$) by multiplying the initial reciprocal estimate by the dividend ($y_0'*a$) in a multiplying circuit of the data processing system and followed by rounding in the rounding circuit;

c) computes a current error approximation ($e_n'$, where n represents an integer and n>0) from the divisor (b) and a current reciprocal estimate ($y_n'$);

d) computes a current quotient estimate ($q_m'$, where m represents an integer and m>=0) from rounding a quotient intermediate value in the rounding circuit, wherein the quotient intermediate value is derived from the previously computed current quotient estimate ($q_{m-i}'$, where i represents an integer and (m-i) >=0), the current reciprocal estimate ($y_n'$), a current remainder estimate ($r_m'$, where m represents an integer and m>=0) or the dividend (a) until the current quotient estimate ($q_m'$) is within 1 ulp of a true quotient (a/b) derived from the dividend (a) and the divisor (b);

e) computes the current remainder estimate ($r_n'$, where m represents an integer and m>=0) from rounding a remainder intermediate value in the rounding circuit, wherein the remainder intermediate value is derived from the current quotient estimate ($q_m'$), the dividend (a) and the divisor (b) until conditions in 23(d), are satisfied;

f) computes the current reciprocal estimate ($y_n'$, where n represents an integer) from rounding a reciprocal intermediate value (E) in the rounding circuit, wherein the reciprocal intermediate value (E) is computed according to the previously computed reciprocal estimate ($y_{n-i}'$, where i represents an integer and (n-i) >=0) or the current error approximation ($e_n'$) until the reciprocal intermediate value (E) has a relative error with respect to a true reciprocal of the divisor (1/b) of less than or equal to $z/(2^{2P})$ (where z is an integer derived from a prior execution of 23(f); and g) obtains the correctly rounded-to-nearest quotient (q'), except possibly when $z>=(2^P-M_b)$ (where $M_b$ represents mantissa of the divisor, b), by multiplying the current remainder estimate ($r_m$) obtained in 23(e), by the current reciprocal estimate ($y_n$) in 23(f). in the multiplying circuit to produce a final product, adding the current quotient estimate ($q_m'$) to the final product in the adding circuit to produce a final sum ($q_m'+r_m*y_n$), and followed by rounding the final sum in the rounding circuit.

23. The data processing system according to claim 22, wherein the data processing system in 23(f) further:

a) identifying an exception case by selecting the current reciprocal estimate ($y_n'$) which corresponds to $z>=2^P$— the divisor (b) mantissa; and b) verifying correctness of the exception case.

24. The data processing system according to claim 22, wherein the rounding operation is a round-to-nearest operation.

25. The data processing system according to claim 22, wherein the data processing system in 23(c) for a single precision implementation of the floating point division further:

a) computes $e_0'=1-b*y_0'$; and b) computes $e_1'=1-b*y1'$.

26. The data processing system according to claim 22, wherein the data processing system in 23(c) for a double extended precision implementation of the floating point division further:

a) computes $e_0'=1-b*y_0'$;

b) computes $e_1'=e_0'*e_0'$;

c) computes $e_2'=e_0'*e_0'+e_0'$;

d) computes $e_3'=e_1'*e_1'+e_1'$; and e) computes $e_4'=1-b*y_2'$.

27. The data processing system according to claim 22, wherein the data processing system in 23(d) for a single precision implementation of the floating point division further computes $q_1'=q_0'+r_0'*y_1'$.

28. The data processing system according to claim 22, wherein the data processing system in 23(d) for a double extended precision implementation of the floating point division further computes $q_1'=q_0'+r_0'*y_2$.

29. The data processing system according to claim 22 wherein the data processing system in 23(e) for a single precision and a double precision implementations of the floating point division further:

a) computes $r_0'=a-b*q_0'$; and b) computes $r_1'a-b*q_1'$.

30. The data processing system according to claim 22, wherein the data processing system in 23(f) for a single precision implementations of the floating point division further:

a) computes $y_1'=y_0'+e_0'*y_0'$;

b) computes $y_2'=y_0'+e_0'*y_1'$; and c) computes $y_3'=y_1'+e_1'*y_2'$.

31. The data processing system according to claim 22, wherein the data processing system in 23(f) for a double extended precision implementations of the floating point division further:

a) computes $y_1'=y_0'+e_2'*y_0'$;

b) computes $y_2'=y_0'+e_3'*y_1'$; and c) computes $y_3'=y_2'+e_4'*y_2'$.

* * * * *

UNITED STATES PATENT AND TRADEMARK OFFICE
CERTIFICATE OF CORRECTION

PATENT NO. : 6,598,065 B1
DATED : July 22, 2003
INVENTOR(S) : Harrison

It is certified that error appears in the above-identified patent and that said Letters Patent is hereby corrected as shown below:

<u>Column 10,</u>
Line 40, delete "$r_1$'a - b*$q_1$'", insert -- $r_1$' = a - b*$q_1$' --.

Signed and Sealed this

Twenty-third Day of December, 2003

JAMES E. ROGAN
*Director of the United States Patent and Trademark Office*